Oct. 24, 1961 H. J. FAUST ET AL 3,005,225
DEVICE FOR APPLYING BUTTER TO CORN ON THE COB
Filed Nov. 24, 1959
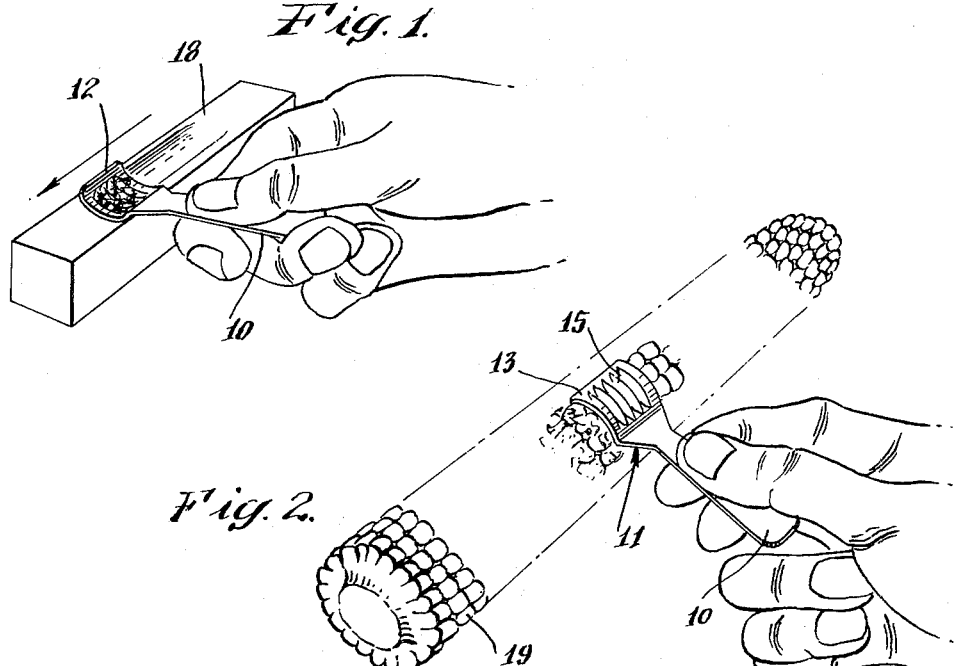
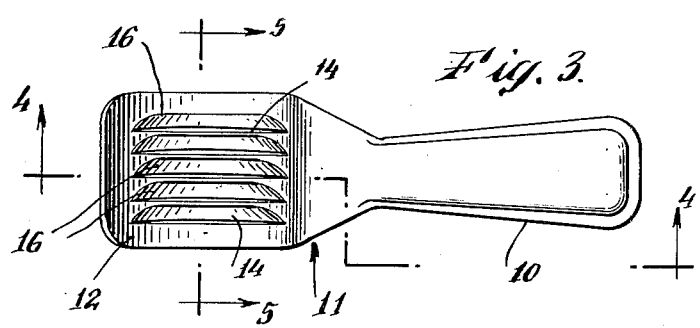
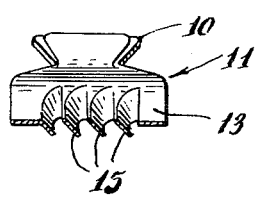
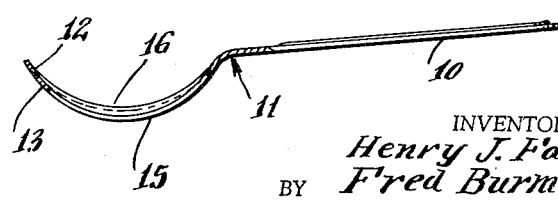
INVENTORS.
Henry J. Faust
BY Fred Burmann
ATTORNEY ated Oct. 24, 1961

3,005,225
DEVICE FOR APPLYING BUTTER TO CORN ON THE COB
Henry J. Faust, 332 Ocean Ave., Massapequa Park, N.Y., and Fred Burmann, 26 Arrow Lane, Hicksville, N.Y.
Filed Nov. 24, 1959, Ser. No. 855,131
4 Claims. (Cl. 15—514)

This invention relates to culinary utensils and more particularly to a novel, simple, yet highly effective device for applying butter to corn on the cob.

Heretofore, numerous devices of this nature have been developed, but many of these were relatively costly and required a considerable degree of dexterity in using the same and furthermore, some of these devices required the use of a knife or other utensil to remove butter from a block or pat and apply the same to the device prior to spreading such butter on the ear of corn. Also some of these prior art devices did not store a sufficient quantity of butter to cover any appreciable portion of the ear of corn, thereby necessitating frequent applications of the device or other utensil, such as a knife, to the supply of butter to transfer the same to the spreading device.

It is accordingly an object of the invention to provide a device for applying butter to corn on the cob, which device may be economically manufactured from readily available materials and sold at a relatively low cost in a highly competitive market.

A further object of the invention is the provision of a device for applying butter to corn on the cob, the use of which required no particular manual dexterity, with the result that the same may be conveniently utilized by men, women or children without any particular intruction or practice in the use thereof.

Another object of the invention is the provision of a device for applying butter to corn on the cob in which a single unitary tool provides the two-fold function of removing butter from a suitable supply, such as a block or pat and thereafter spreading the butter over an appreciable area of an ear of corn.

A further object of the invention is the provision of a device for applying butter to corn on the cob which in one operation may remove butter from a suitable supply, such as a block or pat, store an appreciable quantity of such butter and thereafter, spread the butter over an appreciable area of an ear of corn.

A still further object of the invention is the provision of a device for applying butter to corn on the cob, which device may be conveniently washed and sterilized to maintain the same in a sanitary condition.

Further objects and advantages of the invention will be apparent from the following dscription taken in conjunction with the accompanying drawing wherein:

FIG. 1 is a view in perspective showing the device of this invention and the manner of operation thereof to remove butter from a suitable supply, such as block of such material;

FIG. 2 is a view in perspective showing the device of this invention and the manner of operation thereof to apply butter to an ear of corn;

FIG. 3 a top plan view of a device constructed in accordance with this invention;

FIG. 4 a sectional view taken substantially on the line 4—4 of FIG. 3; and

FIG. 5 a sectional view taken substantially on the line 5—5 of FIG. 3 and showing particularly the formation of the teeth and butter reservoirs.

With continued reference to the drawing, there is shown a device for applying butter to corn on the cob constructed in accordance with this invention, which device may well comprise an elongated handle portion 10 shaped to be conveniently grasped in the hand of the user and the handle portion 10 terminates at one end in an enlarged portion 11 of generally arcuate shape providing a concave inner surface 12 and a convex outer surface 13. It is to be noted that the axis of curvature of the arcuate portion 11 is disposed substantially at right angles to the longitudinal axis of the handle 10 and furthermore, the curvature of the arcuate portion 11 is such that the inner concave surface 12 corresponds substantially to the surface of an average ear of corn.

The arcuate body portion 11 is provided with a plurality of transverse slits 14 spaced along the axis of curvature of the body portion 11 and the material of the device adjacent each slot is deformed to provide teeth 15 projecting outwardly of the convex surface 13 of the arcuate body portion 11.

The slits 14 provide openings between the teeth 15 through the concave surface 12 of the arcuate body portion 11 and it is to be noted, that the teeth 15 are inclined downwardly and in a direction longitudinally of the axis of curvature of the arcuate body portion 11 and the deformed portion of the arcuate body portion 11 utilized to form the teeth 15 provide recesses 16 in the concave surface 12 which serve as reservoirs for butter and which operate in a manner to be presently described. It is further to be noted that as shown in the drawing, the concave surface 12 is substantially smooth and has no projections which would engage an ear of corn and scrape butter therefrom.

The device of this invention is primarily intended to be utilized at the dining table and in the use thereof, there may be provided a supply of butter in the form of the conventional stick or block 17 and as best shown in FIG. 1, the teeth 15 on the convex surface 13 of the device are moved over the block of butter 17 to remove a portion of such butter which flows through the slits 14 and into the recesses or reservoirs 16 in the concave surface 12 of the arcuate portions 11 and this operation will result in forming a concave groove 18 in the surface of the block of butter 17. After filling the recesses or reservoirs 16 with butter, the device is then reversed and the concave surface 12 of the arcuate portion 11 is applied to the convex surface of an ear of corn 19, as shown in FIG. 2, and movement of the device longitudinally along the ear of corn 19 will result in spreading the butter over the surface thereof and, of course, the heat from the ear of corn will melt the butter contained in the recesses or reservoirs 16 and cause the same to flow evenly over the kernels of corn on the ear 19. A sufficient quantity of butter is retained in the reservoirs 16 to cover an appreciable area of the ear of corn 19.

As shown in FIGS. 1 and 2, the device of this invention is relatively small and is so formed as to be conveniently grasped in the hands of the user and the device may be conveniently and economically manufactured from metal, plastic or any other suitable material by relatively simple and well known manufacturing operations, with the result that the cost of such device may be maintained at a minimum, wherby the device may be manufactured in large quantities and sold in a highly competitive market. It will further be noted that the reservoirs or recesses 16 are fully open to the concave surface 12 and furthermore, the slits 14 are relatively large therby permitting convenient cleaning of the device and removal of any residual butter thereby operating to maintain the device in a sanitary condition.

It will be obvious to those skilled in the art that various changes may be made in the invention without departing from the spirit and scope thereof and therefore the invention is not limited to that which is shown in the drawing and described in the specification, but only as indicated in the appended claims.

What is claimed is:

1. A device for applying butter to corn on the cob, said device comprising an elongated handle portion shaped to fit the hand of the user, said handle portion terminating at one end in an arcuate portion with the axis of curvature disposed substantially at right angles to the longitudinal axis of said handle portion, the curvature of said arcuate portion substantially corresponding to the surface of an average ear of corn, said arcuate portion having a plurality of transverse slits spaced along the axis of curvature, the material of said device adjacent each slit being deformed to provide teeth projecting outwardly of the convex surface of said arcuate portion and inclined with respect thereto, said slits providing openings between said teeth through the concave surface of said arcuate portion and said deformed portions providing reservoirs for butter, said concave surface being substantially smooth, whereby movement of said teeth along a block of butter will operate to remove butter and force the same through said slits to the interior of said arcuate portion and into said reservoirs and thereafter, movement of the concave surface of said arcuate portion along an ear of corn will operate to spread the butter on the corn.

2. A device for applying butter to corn on the cob, said device comprising an elongated handle portion, said handle portion terminating at one end in an arcuate portion with the axis of curvature disposed substantially at right angles to the longitudinal axis of said handle portion, the curvature of said arcuate portion substantially corresponding to the surface of an average ear of corn, said arcuate portion having a plurality of transverse slits spaced along the axis of curvature, the material of said device adjacent each slit being deformed to provide teeth projecting outwardly of the convex surface of said arcuate portion and inclined with respect thereto, said slits providing openings between said teeth through the concave surface of said arcuate portion and said deformed portions providing reservoirs for butter, said concave surface being substantially smooth, whereby movement of said teeth along a block of butter will operate to remove butter and force the same through said slits to the interior of said arcuate portion and into said reservoirs and thereafter movement of the concave surface of said arcuate portion along an ear of corn will operate to spread the butter on the corn.

3. A device for applying butter to corn on the cob, said device comprising an elongated handle portion, said handle portion terminating at one end in an arcuate portion, the curvature of said arcuate portion substantially corresponding to the surface of an average ear of corn, said arcuate portion having a plurality of transverse slits spaced along the axis of curvature, the material of said device adjacent each slit being deformed to provide teeth projecting outwardly of the convex surface of said arcuate portion and inclined with respect thereto, said slits providing openings between said teeth through the concave surface of said arcuate portion and said deformed portion providing reservoirs for butter, said concave surface being substantially smooth, whereby movement of said teeth along a block of butter will operate to remove butter and force the same through said slits to the interior of said arcuate portion and into said reservoirs and thereafter movement of the concave surface of said arcuate portion along an ear of corn will operate to spread the butter on the corn.

4. A device for applying butter to corn on the cob, said device comprising a handle portion, said handle portion merging into an arcuate portion, the curvature of said arcuate portion substantially corresponding to the surface of an average ear of corn, said arcuate portion having a plurality of transverse slits spaced along the axis of curvature, the material of said device adjacent each slit being formed to provide recesses and teeth projecting outwardly of the convex surface of said arcuate portion and inclined with respect thereto, said slits providing openings between said teeth through the concave surface of said arcuate portion and said recesses providing reservoirs for butter, said concave surface being substantially smooth, whereby movement of said teeth along a block of butter will operate to remove butter and force the same through said slits to the interior of said arcuate portion and into said reservoirs and thereafter, movement of the concave surface of said arcuate portion along an ear of corn will operate to spread the butter on the corn.

References Cited in the file of this patent

UNITED STATES PATENTS

| | | |
|---|---|---|
| 900,210 | Saltsman | Oct. 6, 1908 |
| 2,219,436 | Anderson | Oct. 29, 1940 |
| 2,714,295 | Schick | Aug. 2, 1955 |